May 2, 1961    M. J. ASPROYERAKAS    2,982,422
RACK COMPRISED OF TUBULAR MEMBERS INTEGRALLY
JOINED BY REINFORCING MEANS
Filed Feb. 25, 1958    2 Sheets-Sheet 1
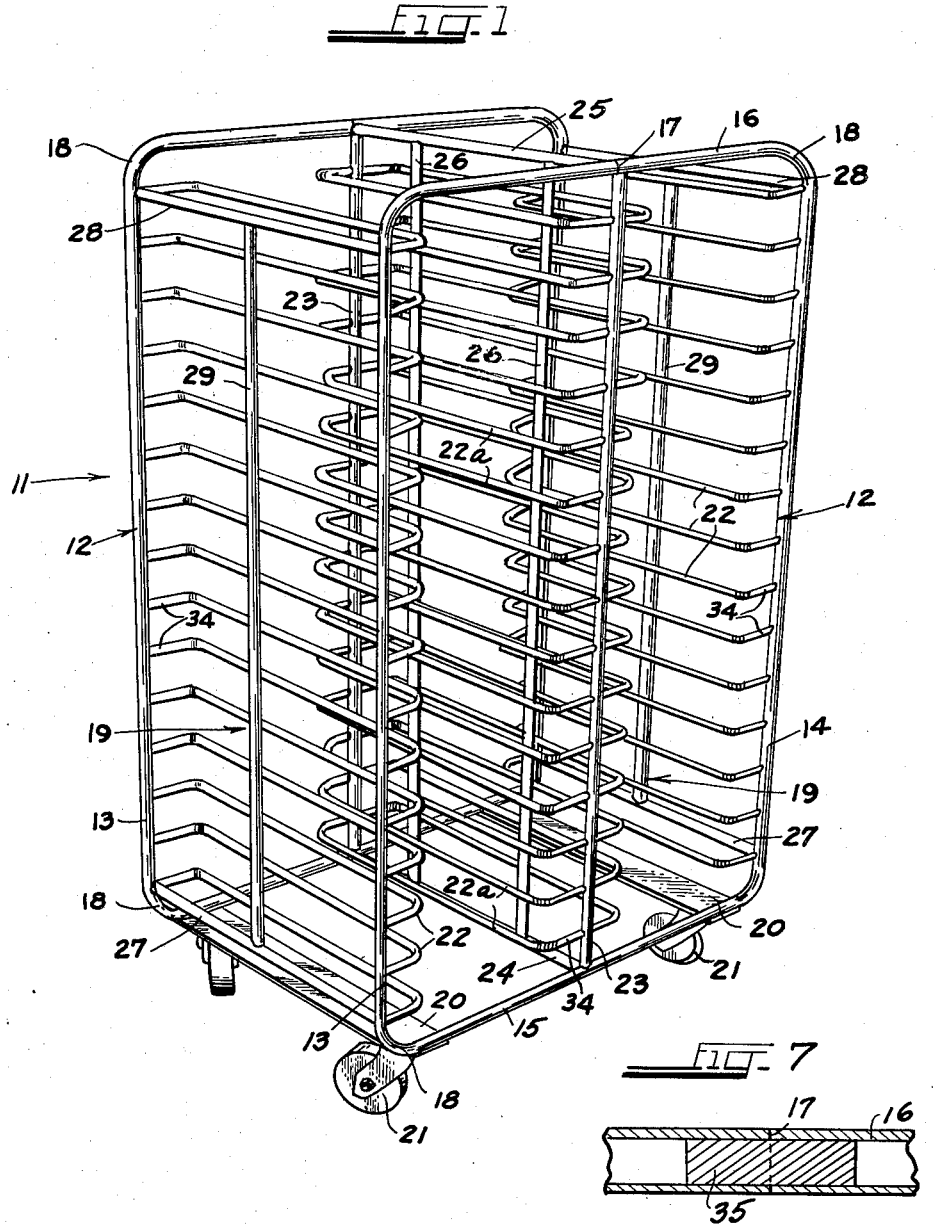
INVENTOR.
MINOS J. ASPROYERAKAS
BY May 2, 1961   M. J. ASPROYERAKAS   2,982,422
RACK COMPRISED OF TUBULAR MEMBERS INTEGRALLY
JOINED BY REINFORCING MEANS
Filed Feb. 25, 1958                                   2 Sheets-Sheet 2
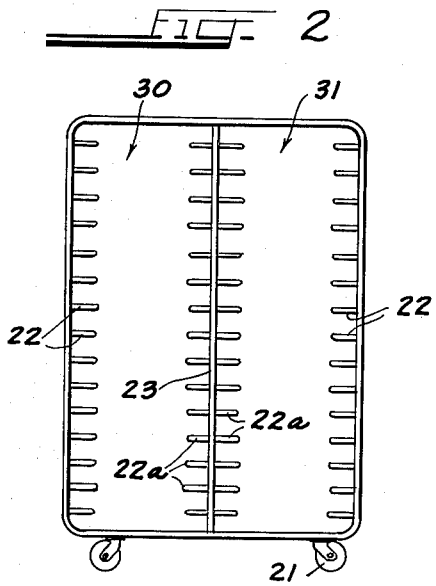
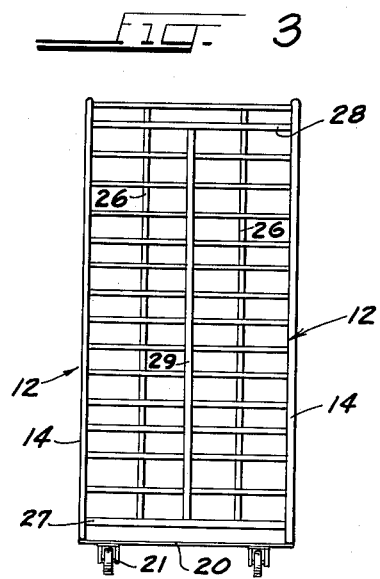
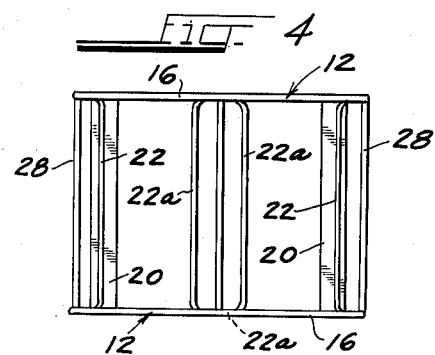
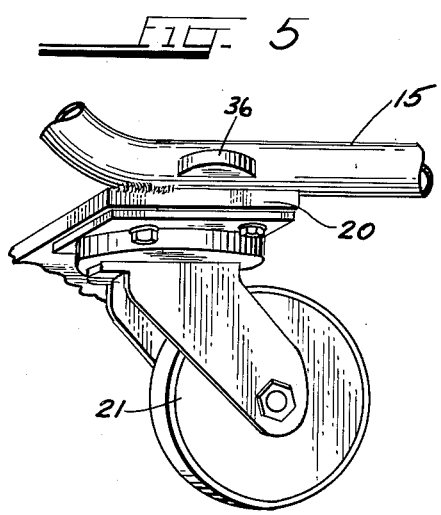
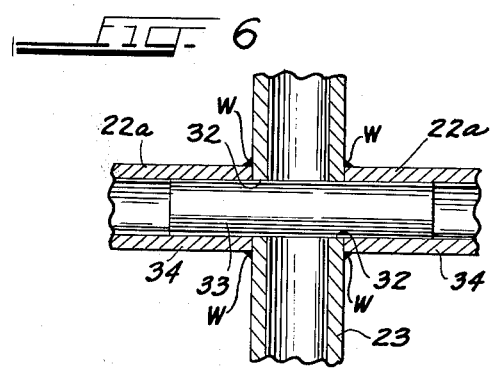
INVENTOR.
MINOS J. ASPROYERAKAS
BY
ATT'Y

United States Patent Office 2,982,422
Patented May 2, 1961

---

2,982,422

RACK COMPRISED OF TUBULAR MEMBERS INTEGRALLY JOINED BY REINFORCING MEANS

Minos J. Asproyerakas, Oak Park, Ill., assignor to James E. Glyman, Chicago, Ill.

Filed Feb. 25, 1958, Ser. No. 717,440

7 Claims. (Cl. 211—134)

This invention relates to bakery equipment; to means for supporting and transporting bakery pans and trays; and more particularly to a novel bakery rack construction which, though simple in design and light in weight, is capable of carrying large loads and tolerating abuse without requiring undue maintenance and repair, and which lends itself readily to the maintenance of high hygienic standards.

In the baking industry the racks used to hold and transport bakery products may be called upon for use in any one of many routine product handling operations. For example, they are used to hold trays or pans during proofing of the products, they are used in cooling and refrigeration compartments, they are used for storage of the products, or they are even used for general utility handling of the products anywhere in the bakery. As a consequence, the racks are subject to a great deal of rough handling and abuse, while also being exposed to conditions which tend to accelerate their deterioration. To obviate this problem quite often different type racks are used for the different product handling operations, each type having specific structural and other physical properties which give rise to its use. This, of course, greatly increases over-all costs, and further necessitates a greater amount of floor space for rack storage.

Numerous racks of the general construction of the rack disclosed herein, of course, heretofore have been proposed and used, but these have not proved entirely satisfactory. All known rack constructions require the use of fittings, braces or gussets to connect their structural components and maintain them rigid. True rigid and integral rack framework is not provided. These fittings, braces, etc., add appreciably to the costs and labor of manufacturing the racks. And, because of the handling and abuse to which the racks are subjected, the connecting fittings, bolts, and even rivets, eventually work loose, resulting in loss of rack rigidity and ultimate complete breakdown unless close observation, repair and maintenance of the racks are maintained at all times. The character of the baking industry, however, demands that equipment nearly always be on hand for use, since baking may be performed nearly around-the-clock. Inspection, maintenance and repair of the racks, thus, may be difficult or even impossible to accomplish, since they may not be available for such purposes until they experience complete breakdown. There thus has been a long felt need for a simple and dependable all purpose bakery rack which is economical to manufacture and which requires no great degree of maintenance.

The present invention, in the light of this need, contemplates the provision of a novel rack construction which may be used for all known bakery product handling operations and which provides a completely integral framework requiring no fittings, braces, gussets, etc., to maintain the components rigid. In its preferred embodiment, the rack is made of an aluminum alloy capable of withstanding the abuse of proofing and refrigeration operations, and fabricated from tubular stock to give it strength and rigidity comparable to steel while being light in weight and capable of easy handling and maneuvering. The tubular stock is bent to shape and welded; and where components of the frame are connected, a novel strengthening pin may be added to provide additional strength and rigidity to the welded connection.

Accordingly, a principal object of the present invention is to simplify and improve the construction of racks of the character described.

Another object of this invention is to provide a bakery rack structure which includes an integral welded frame and support shelf construction requiring the use of no braces, fittings, gussets or other fasteners to connect the rack components.

A further object of this invention is to provide a bakery rack construction made virtually entirely from tubular stock which readily may be bent to the shapes of the rack component parts.

In carrying out the invention, it further is an object thereof to provide the tubular stock in a form which resists the accumulation of dirt, crumbs and other matter thereon, and thus it is preferred that the tubular stock be provided from ordinary pipe, the outer surface of which is circular, and which is readily available at economical prices.

And still another object of this invention is to provide the rack framework and shelving from material which is light in weight yet possesses the requisite strength which resists rust and corrosion, which is sufficiently hard to resist dents and fracture, and yet may be readily shaped to form framework requiring no fittings, braces, gussets, etc., to maintain the components rigid. In its preferred embodiment, the rack is made from an aluminum alloy capable of withstanding the abuse of proofing and refrigeration operations, and fabricated from tubular stock to give it a strength and rigidity comparable to steel while being light in weight and capable of easy handling and maneuvering. The tubular stock is cut, bent to shape, and the components are welded together, the materials and parts lending themselves readily to known welding techniques during fabrication of the rack.

These and other objects, advantages and features of construction will become more apparent upon a consideration of the following description together with the accompanying drawings.

In the drawings:

Figure 1 is a perspective of the rack comprising the present invention;

Figure 2 is a front elevation view of the same;

Figure 3 is a side elevation view of the rack;

Figure 4 is a plan view thereof;

Figure 5 is a fragmentary view of a rack supporting member and track guide;

Figure 6 is a cross-sectional view showing a typical construction whereat rack rails are mounted to the framing; and Figure 7 is still another cross-sectional view showing construction of the rack framing.

Reference is first made to the general construction of the rack comprising the present invention. As seen in Figure 1, the frame of the rack 11 includes similar spaced apart side members 12, 12, each of which preferably is made from tubular stock bent to form a closed rectangle including upstanding support posts 13, 14, integrally joined by horizontal legs 15, 16, of the rectangle. The junction 17 between the ends of the stock from which each side member is bent preferably occurs midway of the upper leg 16. Each corner 18 between an upstanding post and a horizontal leg is rounded during the bending operation, providing an integral connection between the vertical and horizontal components of each side member 12, and one having no sharp or projecting parts. Being integral, this further insures maximum permanent rigidity while eliminating the necessity of employing gussets or other fittings to connect the components.

The rack further includes end bracing members 19, 19, between side members 12, 12, bottom cross members 20, 20, from which swivel casters 21 are mounted, rails 22 also bent to shape from tubular pipe stock of smaller cross-section than the frame members, and intermediate vertical tubular posts 23, 23, each extending between the horizontal legs 15, 16, of a respective side member 12, and providing support for intermediate rails 22a. Additionally, intermediate tubular cross members 24, 25 are provided, the former extending between the spaced lower horizontal legs 15 of the members 12, 12, and the latter extending between the spaced upper horizontal legs 16 of the members 12, 12. Vertical tubular posts 26, 26, extending between cross members 24, 25, further are provided to impart rigidity to the entire structure. Each end bracing member 19 includes lower and upper horizontal tubular members 27, 28, respectively, which extend between corresponding upstanding posts of the side members 12, 12, while a vertical tubular member 29 extending between members 27, 28, provides additional bracing.

As seen in Figure 2, the rails are sufficiently wide to prevent slide-off of trays or pans they are intended to support, and are spaced one above the other sufficiently to provide adequate room so that the bakery products do not strike the pan or tray thereabove as the products are loaded and unloaded to and from the rack. Support rails 22 are U-shaped, mounted between corresponding upstanding posts of the members 12, 12, and paired with oppositely facing rails 22a which extend between intermediate vertical posts 23, 23, to provide two tiers 30, 31, whereat pans or trays may be held on the rack. Each leg of a U-shaped rail is connected to a vertical post for support therefrom.

Figure 6 illustrates a typical weld connection for the rails 22. In particular, it shows the connection for oppositely facing rails 22a onto an intermediate post 23. In preparation for receiving a rail, diametrally opposed holes 32, 32, are provided in the post and a reinforcing pin 33 inserted therein, extends from the post to receive the leg 34 of one rail. A force fitting of the pin 33 into the leg 34 is preferred. Thereafter, the rail leg 34 is welded at W to the post by conventional welding operations. The pin 33 extends diametrally opposite to receive a leg 34 of the oppositely facing shelf which also is force fitted thereon and thereafter welded to the post.

On the upstanding posts 13 and 14, the same procedure is followed to attach rails thereto, except that the pin 33 extends only to receive one rail, while at the diametrally opposed face of the post the pin end is welded flush to the surface thereof.

Connections between the several frame members also may be made in the same manner; that is, holes may be drilled for the reinforcing pins which then are force fitted into the member they are intended to receive, and thereafter the entire joint is welded. In particular, at the junction 17 between the ends of each rectangular side member 12, a reinforcing pin 35 is force fitted into each end, after which the ends are welded together, as best seen in Figure 7.

It is preferred that the framing and rails virtually all be formed from round tubular stock such as piping so as to present as little dust and dirt catching surface as possible. As illustrated, the cross-members 20, 20, are flat to receive the casters 21; although it should be understood that they too could be piping with appropriate caster provisions. Moreover, it is preferred that the stock be formed from an aluminum alloy which is rust and corrosion resistant, light in weight, yet capable of withstanding the handling racks customarily receive in bakeries.

As best seen in Figure 5, a boss or bumper 36 is provided on the horizontal legs 15 adjacent the swivel casters 21 to serve as a guide to prevent the rack structure from striking other equipment when the rack is passed, for example, through a proofing chamber.

The herein rack 11 thus is made virtually throughout from piping stock, which preferably is formed from an aluminum alloy, and is assembled as a skeleton-like structure which includes spaced side members 12, 12, arranged in confronting parallelism. Each side member includes a pair of spaced upright posts 13, 14, integrally joined at their tops and bottoms by horizontal legs or posts 15, 16, to provide a substantially rectangular frame member, of which the included angles between adjacent posts are formed by smooth ninety degree bends of said piping. An intermediate upright post 23 is provided at each side member 12 to thus provide two tiers 30, 31, whereat opposite facing U-shaped rails 22, 22a, are mounted for reception of baking trays or pans.

All rails 22 or 22a are rigidly mounted to the upright posts by welding, there being provided, for each rail leg 34 whereat it is mounted, an opening wherein a reinforcing pin 33 is welded and arranged for a force fitting into the leg 34 to which it is intended to impart rigidity. All remaining frame members are welded in position, and a reinforcing pin also may be provided at the junction 17 of the end of the length of stock from which each end member 12 is formed to provide additional strength at the welded connection between the ends.

From the foregoing, it is evident that the herein rack 11 is characterized by an absence of the usual gussets and other fittings found in racks of the same general construction, and yet the rack possesses even far greater rigidity of structure, with consequent lower maintenance and longer life, than it was possible heretofore to achieve. Moreover, as is evident and inherent from its construction, the herein rack lends itself readily to modern and rapid mass production methods, while possessing simplicity and economy of manufacture.

Although what has been shown and described are preferred embodiments of the invention, it should be understood that these are not intended to be exhaustive nor limiting the invention, but instead are given for the purpose of illustration so that the invention may be better understood, and that others skilled in the art may be able to modify and alter the invention without departing from the spirit thereof, the scope of which is defined in the appended claims.

What is claimed is:

1. A bakery rack characterized by the absence of fittings, braces and the like, and consisting virtually throughout of piping stock of circular cross-section assembled in a skeleton-like structure, said rack comprising: a pair of spaced confronting substantially rectangular frames arranged in parallelism, each frame comprising a length of said stock bent to shape to include a pair of spaced upright corner posts and upper and lower horizontal posts extending between the corner posts, the included angle between adjacent corner and horizontal posts being provided by a ninety degree bend of the length of stock, the respective ends of each length of stock being secured together in abutting relation; each frame further including an intermediate upright post, positioned between the respective frame corner posts and secured at its ends to the respective frame horizontal posts; means securing said frames in rigid relationship; and a plurality of paired oppositely facing rails arranged to provide two tiers of the same, each rail being U-shaped and provided from tubular stock and having legs interposing the same between corresponding upright posts of said frames, there being vertically spaced apertures in said upright posts, and pins set in said apertures, each pin receiving the leg of the rail proximate thereto for fitting within the rail tubular structure to effect rigid spaced relation between the rails.

2. The rack described in claim 1 wherein the ends of each of said lengths of stock are secured together by welding, the pins are welded in said apertures, and each rail leg is force fitted over its respective pin and welded to the upright post supporting the same.

3. The rack described in claim 2 wherein a strengthening pin is force fitted into the abutting ends of each rectangular frame to effect a rigid connection between the abutting ends.

4. A carrier for the transportation of bakery products or the like, comprising: a unitary skeleton-like structure including a pair of endless substantially rectangular frames arranged in spaced vertical and parallel planes, each frame being bent to shape from a respective length of tubular piping of circular cross-section to form spaced posts and horizontal legs, the ends of each length of piping being welded together in abutting relation; means maintaining said frames in rigid confronting relation including a plurality of vertically spaced horizontal rails at each pair of corresponding posts of said frames, each rail being U-shaped and provided from tubular piping of circular cross-section, having its legs welded to its corresponding posts, and in vertical registry with another rail supported from the other of the paired corresponding posts of said frames; and means extending from said posts for reception within the legs of said rails to effect rigid mounting thereof.

5. In a rack comprising two generally rectangular frames confrontingly arranged in spaced vertical and parallel planes, said frames each being provided from a single length of tubular stock bent to form spaced posts and horizontal legs to conform to the desired size and shape, with structural members extending between the frames at selected levels to comprise rails, said structural members each being provided from a single length of tubular stock bent to a U-shaped configuration, the improvement comprising the provision of apertures at said selected levels in the posts of said frames, and means extending from said apertures for reception within the legs of said rails to effect rigid spaced relation of the rails on the frames.

6. The rack described in claim 5 wherein at each of said selected levels, at each of said posts, said apertures are provided as diametrically opposed openings, and wherein said means includes pins, each seated within a respective pair of said openings and force fitted within a leg of one of said rails.

7. In a rack comprising two generally rectangular frames confrontingly arranged in spaced vertical and parallel planes, said frames each being provided from a single length of tubular stock bent to form spaced posts and horizontal legs to conform to the desired size and shape, with structural members extending between the frames at selected levels to provide rails, said members each being provided from a single length of stock bent to a U-shaped configuration, the improvement comprising the provision in the posts of each frame of openings at said selected levels, and means for securing the legs of the rails to said posts at said openings.

References Cited in the file of this patent

UNITED STATES PATENTS

| | | |
|---|---|---|
| 501,918 | Caldwell | July 25, 1893 |
| 958,751 | Lovett | May 24, 1910 |
| 1,267,524 | Ewart | May 28, 1918 |
| 1,563,057 | Williams | Nov. 24, 1925 |
| 2,404,145 | Schweickart | July 16, 1946 |
| 2,558,611 | Emmart | June 26, 1951 |
| 2,600,298 | Jarrett | June 10, 1952 |
| 2,671,004 | Chadwick | Mar. 2, 1954 |

FOREIGN PATENTS

| | | |
|---|---|---|
| 863,593 | Germany | Jan. 19, 1953 |
| 1,138,600 | France | Jan. 28, 1957 |